G. MARTINEZ.
ADDING MACHINE.
APPLICATION FILED JAN. 27, 1915.
1,176,844.
Patented Mar. 28, 1916.
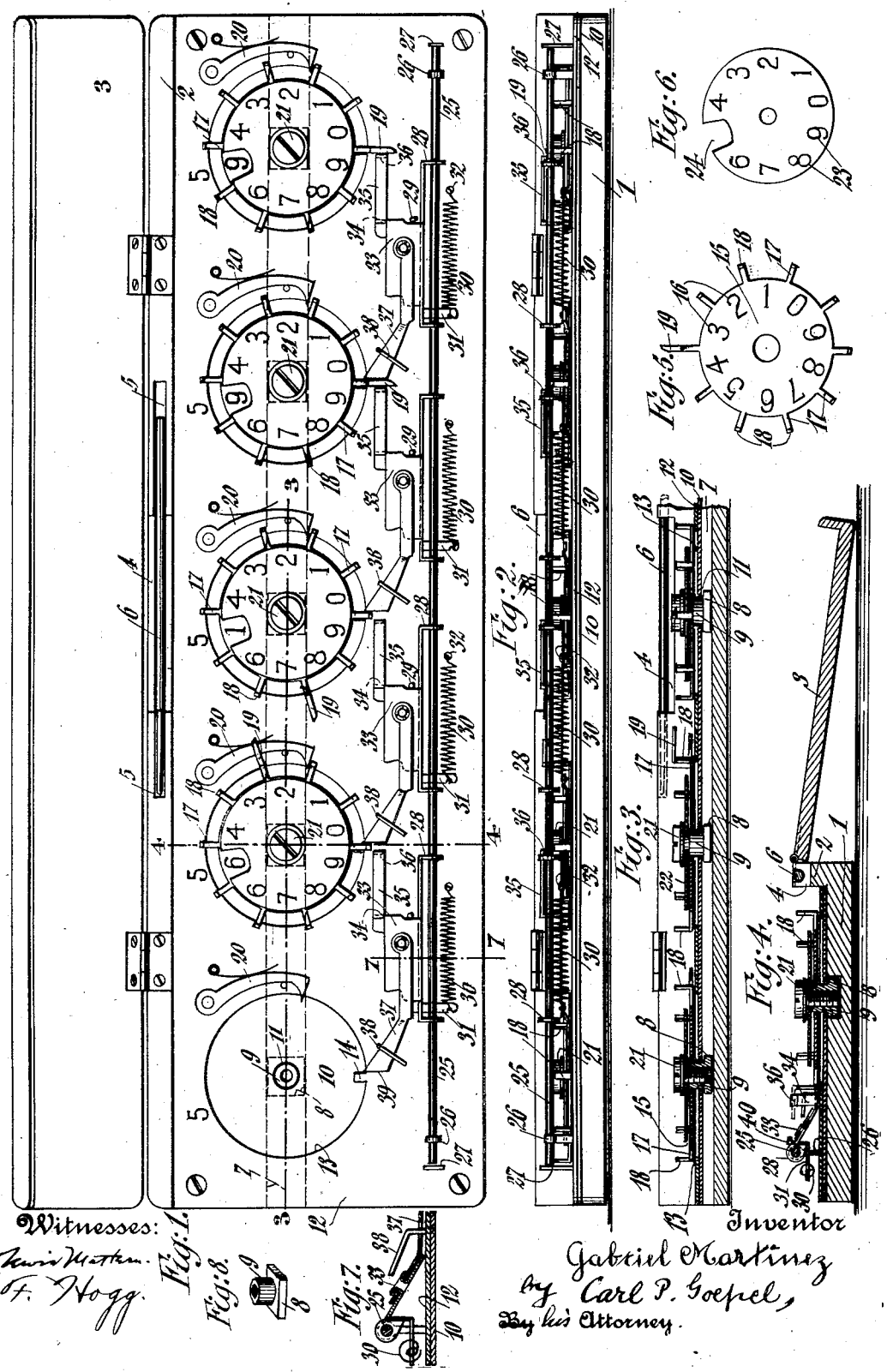
Witnesses:
Inventor
Gabriel Martinez
By Carl P. Goepel,
his Attorney.

UNITED STATES PATENT OFFICE.

GABRIEL MARTINEZ, OF NEW YORK, N. Y.

ADDING-MACHINE.

1,176,844.  Specification of Letters Patent.  Patented Mar. 28, 1916.

Application filed January 27, 1915. Serial No. 4,633.

*To all whom it may concern:*

Be it known that I, GABRIEL MARTINEZ, a citizen of the Republic of Mexico, and a resident of New York, in the county and State of New York, have invented certain new and useful Improvements in Adding-Machines, of which the following is a specification.

This invention relates to improvements in and relating to adding machines, and has for its object to provide a device of this character, simple in construction, and economical of manufacture, and one which will be quickly and accurately operated.

Another object is to provide such a device which will be so substantial and compact that it may be conveniently carried in the pocket without danger to the operative parts.

With these and other objects in view, my invention consists of the novel details, construction and arrangement of parts, hereinafter more fully described and pointed out in the claim.

In the drawings, Figure 1 is a plan view of my improved device; Fig. 2 is a front elevational view thereof; Fig. 3 is a section through the line 3—3 of Fig. 1; Fig. 4 is a section on the line 4—4 of Fig. 1; Fig. 5 is a detail showing one of the revolving disks; Fig. 6 is a detail showing one of the stationary disks; Fig. 7 is a section through the line 7—7 of Fig. 1; and Fig. 8 is a detail of the pivot for the rotating disks.

Similar reference characters indicate corresponding parts throughout the several views.

Referring to the drawings, and more particularly to Fig. 1 thereof, a base 1 of wood or other suitable material having at the rear a longitudinal raised portion 2, to which a top 3 is hinged, is provided with a cut-out portion 4, at either side of which are grooves 5 in which rest the ends of a pointed rod or disk actuator 6. The said base is provided with a longitudinal groove 7, in which rests the squared ends 8 of the stub shafts or pivots 9. A plate 10, preferably of metal, is secured to the base 1, and is provided with longitudinal perforations 11 registering with the said groove 7, through which the shafts 9 project, and screwed to the said plate 10 and base 1 is a second plate 12 having a corresponding number of enlarged perforations, forming with the plate 10 recesses 13, and provided at their lowermost point with a small projection or lug 14. The said perforations 11 are arranged centrally of the said recesses 13, and are of a number corresponding to the adding capacity of the machine, the five divisions shown indicating, reading from right to left, units tens, hundreds, thousands, and tens of thousands. For a larger machine, the arrangement shown would merely be continued to the left.

Pivoted on the shafts 9 are rotating disks 15 smaller in diameter than the said recesses, so that an annular groove is formed which is obstructed at the bottom by the lug 14, and on the rim of the said disk are circumferentially arranged numerals or digits 16 from "0" to "9". On the periphery of the disk 15 and between each of the numerals are provided radial lugs or projections 17, which extend beyond the recess 13, and have at their ends perpendicular portions 18, and arranged on the said lug and upstanding portion, between the numerals 3 and 4, is a horizontal actuating finger 19. A spring-pressed pawl 20 is arranged to the side of each disk, and by resting on the upper faces of the lugs 18 prevents backward movement of the disk.

Secured on top of the shaft 9 by a screw 21 is a stationary disk 22 of the same diameter as the rotating disk 15, and provided circumferentially with numerals or digits 23 from 0 to 9 with the exception of the numeral 5 which is placed on the plate 12. Between the numerals 4 and 6 is provided a cut-out portion 24, through which one numeral on the rotating disk 15 is exhibited to represent the result. The stationary disks 22 are so arranged that the lug or abutment 14 is between the 0 and 9, so that when the actuating finger 19 of the rotating disk covers the said abutment, the numeral 9 will be exhibited at the cut-out portion 24.

Mounted on the base in front of the series of disks is a rod 25 held in raised position by the bearing members 26 and prevented from longitudinal movement by the abutments 27. Between each pair of disks is slidably mounted on the said rod 25 by means of lugs 28 having apertures therein, an actuating mechanism normally held against a pin or projection 29 on the plate 12 by a spring 30 secured between a projection 31 thereon and a point 32 of the said plate. The said actuating mechanism comprises an inclined portion 33 provided on its front end with an upstanding portion 34 at the end of which is a longitudinal bar 35, having at its outer end a bent down portion 36 adapted to be engaged by the actuating finger 19 of the rotating disk. Pivoted to the inclined portion 33 is an angular pusher bar 37 adapted to rest, because of the inclination of the said portion 33, and the force of gravity against a stop 38. The said pusher bar has a straight front edge 39, the end of which is adapted to engage the upstanding portions 18 of the radial projections 17 of the rotating disks. If desired, back stops 40, shown in Fig. 4, may be provided on the inclined portion 37 to prevent dislocation of the pusher bars 37, when the device is being handled or carried about in the pocket.

The operation of my improved adding machine is as follows: When an addition of figures is to be made, the rod or pointer 6 is removed from its groove in the box, and with the pointed end thereof the revolving disks are moved by placing the point in the annular channel of the recess 13, between the projections 17 at either side of the numeral to be added, appearing on the stationary disk, and turning to the right, until the abutment 14 is struck. If units are to be added, the disk to the extreme right is revolved; if tens are to be added, the next disk to the left is revolved, and so on. When the number 9 has been reached in any of the divisions, the projection 17 carrying the actuator finger 19 covers or registers with the abutment 14, so that by the addition of another figure in that divsiion, this finger 19, which is adapted to engage the end 36 of the bar 35, pushes the said bar to the left, thereby moving the inclined actuating mechanism carrying the bar 37, which engages by gravity the portion 18 of the projections 17 of the next revolving disk, thereby turning the same one space. When so moved, the force of the spring 30 draws the actuating mechanism back to its normal position, the bar 37 in its backward movement riding over the next succeeding projection. The pawl 20 prevents any backward movement of the revolving disks during this operation. In the drawing, it will be noted the amount 6,199 appears as a result in the cut-out portions 14. If, for instance, the number 2 were to be added to this, the pointer would be placed in the channel before the figure 2 of the stationary disk of the "units" division, and turned to the right until stopped by the abutment 14. By this operation the figure "1" would appear in the cut-out portion 24 of the "units" division, the actuating finger 19 of the "units" division would move the "tens" actuating mechanism, and turn the disk of the "tens" division one space, so that "0" would appear, and the actuating finger 19 of the "tens" division would move the "hundreds" actuating mechanism, and turn the "hundreds" division one space, so that "2" would appear, giving the result of the addition of 6,199 and 2, as 6,201. As another instance, suppose the number 22 were to be added to the amount 6,199; the "tens" disk would first be moved by placing the pointer opposite the figure 2, making the numeral 1 appear in the cut-out portion 14, and moving the "hundreds" disk one space, by means of the actuating finger 19, making the numeral 2 appear in the "hundreds" division. The "units" disk would now be moved, placing the pointer next to the numeral 2, thereby making the numeral "1" appear in the cut-out portion 14, and moving the "tens" disk by means of the finger 19, so that the numeral "2" will appear in the cut-out portion 14 thereof, giving the result of the addition of 6,199 and 22 as 6,221. If desired, this operation may be in the inverse order, with the same result, as will be obvious.

In order to reset the device, all of the disks 15 are turned, so that the numeral 9 appears in the cut-out portions 14 of all the divisions, and the "unit" disk is turned one space, thereby bringing all of the disks to "0."

The process of multiplication may also be carried out by my device in the following manner: Suppose the multiplicand 156 and the multiplier 25. The disks would all be set at "0" and starting in the "units" division, the "units" disk would be turned five times, each time starting at "6," the "tens" disk would be turned five times, each time starting at "5," and the "hundreds" disk would be turned five times, each time starting at "1." This would give the result of the multiplication by the "units" figure of the multiplier as "780." The multiplicand is multiplied by the "tens" figure of the multiplier by starting in the "tens" division and turning the "tens" disk twice, each time starting with the figure "6," the "hundreds" disk twice, each time starting with the figure "5," and the "thousands" disk twice, each time starting with the figure "1." This would give the result 3,900.

I have illustrated a preferred and satisfactory form of my invention, but it is obvious that changes may be made therein within the spirit and scope thereof, as defined in the appended claim.

I claim:

A device of the character described comprising a series of manually actuatable rotary indicating disks, a rod extending along said series side by side and parallel therewith, and a series of intervening intermittent motion-transmitting mechanism comprising parts disposed at intervals on said rod and slidable thereon.

In testimony that I claim the foregoing as my invention, I have signed my name in presence of two subscribing witnesses.

GABRIEL MARTINEZ.

Witnesses:
D. NEVOIR MATTERN,
JOS. BISBANO.